United States Patent [19]
Nakada

[11] 4,086,807
[45] May 2, 1978

[54] QUAKE-SENSING STARTING DEVICE

[75] Inventor: Tohru Nakada, Yokahama, Japan

[73] Assignee: Subaru Denshi Seiki Kabushiki Kaisha, Kamakura, Japan

[21] Appl. No.: 710,706

[22] Filed: Aug. 2, 1976

[30] Foreign Application Priority Data

Aug. 5, 1975 Japan .............................. 50-094767
Nov. 11, 1975 Japan .............................. 50-134726

[51] Int. Cl.² ........................................... G01V 1/16
[52] U.S. Cl. .................................. 73/652; 340/261; 340/17 R
[58] Field of Search ............ 73/71; 340/261, 17 R; 116/114 D; 200/61.45 M

[56] References Cited

U.S. PATENT DOCUMENTS

| | | | |
|---|---|---|---|
| 2,843,076 | 7/1958 | Cook et al. | 200/61.45 M |
| 3,270,159 | 8/1966 | Soos | 200/61.45 M |
| 3,784,773 | 1/1974 | Jubenville | 200/61.45 M |

*Primary Examiner*—Anthony V. Ciarlante

[57] ABSTRACT

A conical recess of an angle of 140° to 170° is provided at the lower surface of a separator member that is attached to the lower surface of a magnet maintaining a horizontal relation, and a steel ball is absorbed onto the center of the recess. The steel ball weight can sensitively and reliably respond to any low, middle and high frequency ranges, so that the weight falls overcoming the magnetic force to start the function. In addition to the foregoing, the retainer fitting of said magnet is supported by pairs of bearings each having a phase difference of 90° so as to be oscillated in all directions, an oscillator plate is provided via a hanging member formed integrally with said magnet retainer fitting, a base of a receiving dish provided underneath the weight is so mounted as will be movable in the upper and lower directions, whereby said oscillator plate is oscillated freely when said base of the receiving dish is displaced upward, and said oscillator plate is fixed when the bed of said receiving dish is displaced downward, in order that the magnet retainer fitting is maintained in strict vertical relation.

6 Claims, 3 Drawing Figures

QUAKE-SENSING STARTING DEVICE

BACKGROUND OF THE INVENTION

The present invention is concerned with a device which senses vibration in case abnormal vibration such as that associated with an earth quake has happened and which works to start a corresponding function.

With regard to, for example, earth quakes, it is reported that the vibration which exceeds a certain value, i.e., which exceeds about 80 gal in terma of acceleration (seismic coefficient 5) may give damage to human beings and animals. It is also reported in the past earth quake statistics that the frequency of vibration of the earth quake ranges from 1 HZ to 5 HZ. It is, therefore, required for the quake-sensing starting device to have uniform and reliable performance to sense vibrations over the entire wide range of from 1 HZ up to, for example, 5 HZ. Many of the earlier quake-sensing starting devices, however, were, on the one hand, sensitive to some particular frequency ranges of the vibration but were not, on the other hand, sensitive to other frequency ranges of the vibration. For example, with a conventional vibration-sensing mechanism shown in FIG. 3, the separator plate 1 interposed between the lower surface of a magnet 2 and the upper surface of a steel ball 3 was of uniform thickness, in which the distance between the two was always uniform even at the central portion or at the peripheral portions whereby the intensity of the magnetic force of the steel ball 3 was the same regardless of the displacement of the steel ball 3. Particularly, in the lower frequency ranges, the steel ball 3 could not roll below the lower surface of the separator plate 1 to get out of the magnetic force; the steel ball 3 would not often fall to start the reporting or alerting function.

On the other hand, the mounting angle of a handle of valves or cocks which shuts off the passage of liquid is seldom placed just horizontal but is largely tilted, as could be recognized from the household propane gas containers that are usually just out of right-angled position. Therefore, where the vibration-sensing starting device of the type in which the weight is hung by way of a magnet and falls upon sensing the vibration, was mounted on the aforesaid object bodies, the lower surface of the magnet was inclined and the weight was not stably absorbed, and further, the weight often failed to operate reliably.

The first object of the present invention, therefore, is to provide a quake-sensing starting device which has minimized the aforementioned defects and which can sensitively and reliably respond to any low, middle and high frequency ranges, so that the weight falls down overcoming the magnetic force to start the sensing function.

The second object of the present invention is to provide a quake-sensing device which has improved the aforementioned defects and which can keep the vibration-sensing part at a horizontal relation by correcting the deviation even where the object body is installed on an inclined position, to ensure reliable functioning of the device.

SUMMARY OF THE INVENTION

Summarizing the setup of the present invention, a conical recess of an angle of 140° to 170° is provided at the lower surface of a separator member that is attached to the lower surface of a magnet maintaining a horizontal relation, and a steel ball is positioned onto the center of the recess. When the steel ball has detected vibration of a low frequency and rolled and displaced toward the circumferential part from the center of the recess, the intensity of magnetic force to the steel ball is decreased with the increase of thickness of the separator member so that the steel ball can fall overcoming the magnetic force. When the steel ball has sensed the vibration of middle frequencies, the steel ball is slidably moved and displaced with respect to the lower surface of the separator member so that the steel ball can fall down overcoming the magnetic force. And where the steel ball has sensed the vibration of high frequencies, the steel ball undergoes small displacement from the center of the lower surface of the separator member and is spun with the perpendicular of the steel ball as an axis, so that the steel ball falls down overcoming the magnetic force acting on the steel ball. Or in addition to the foregoing, according to the present invention, the retainer fitting of said magnet is supported by pairs of bearings each having a phase difference of 90° so as to be oscillated in all directions, an oscillator plate is provided via a hanging member formed integrally with said magnet retainer fitting, a base of a receiving dish provided underneath the weight is so mounted as will be movable in the upper and lower directions, whereby said oscillator plate is oscillated freely when said base of the receiving dish is displaced upward, and said oscillator plate is fixed when the bed of said receiving dish is displaced downward, in order that the magnet retainer fitting is maintained in strict vertical relation.

BRIEF DESCRIPTION OF THE DRAWINGS

The present invention is illustrated below in detail with reference to a concrete embodiment shown in the accompanying drawings, in which.

DESCRIPTION OF THE PREFERRED EMBODIMENTS

Figures 1, 2, 3:
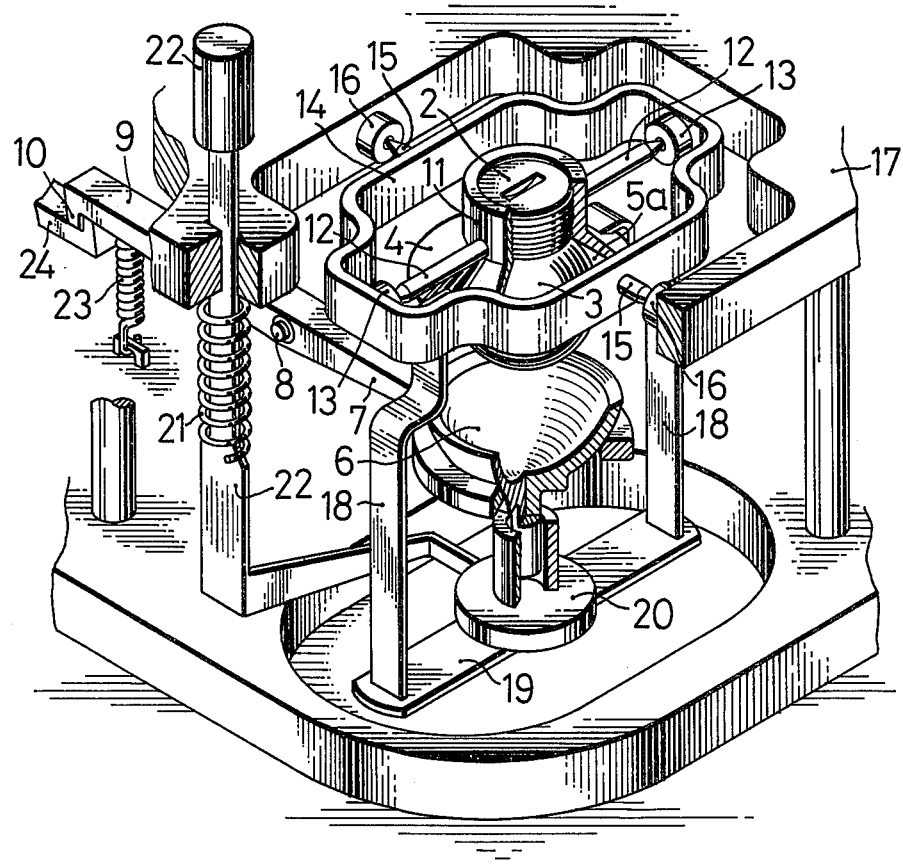
FIG. 1 is a partly cut-away perspective view showing a particular embodiment of the present invention.
FIG. 2 is a cross-sectional view to illustrate the major part of the present invention.
FIG. 3 is a diagram to illustrate a vibration-sensing mechanism of the prior art.

According to the present invention, the thickness of the separator member 4 fitted to the horizontal lower surface of the magnet 2 is made zero or near zero at the central part, and the peripheral part is inclined to become thicker toward the external side. Therefore a conical recess 5 is formed at the lower surface of the separator member 4. Said conical recess 5 can be made in the form of a conical trapezoidal recess 5a having some expansion at the central part that serves as an apex of a cone as shown in an embodiment of FIG. 1. With regard to the opening degree of the angle A which is smaller than 180° but larger than 90° at the apex of said conical inclined surface, if the opening degree of angle is near 180°, the problem is not eliminated just like a conventional example shown in FIG. 3. On the other hand, if the angle is reduced to near 90°, the steel ball 3 is sandwiched in said conical recess 5 and is significantly less responsive to the vibration. A variety of experimental results indicate that the falling phenomenon of the weight 3 is developed uniformly over each of the frequency ranges if the opening degree of the angle A ranges from 140° to 170°, and particularly, if the opening degree of the angle A is 160°. The aforesaid separator member 4 is, of course, made of a non-magnetic material. In the above embodiment, the weight 3 is of a spherical shape made of steel, but the lower half of the weight needs not necessarily be of a spherical shape, as the part of the weight contacting to the recess 5 of the separator member 4 produces the same effect if only such a part is at least of a spherical shape.

Beneath the lower side of the weight 3 is provided a receiving dish 6 to receive the weight when it is fallen. The downward displacement of the receiving dish 6 created by the weight of the weight 3 is transmitted to a lever 9 on the other side of a fulcrum 8 via a support lever 7 of said receiving dish 6. For example, a pawl 10 provided at the tip of the lever 9 is displaced as shown in FIG. 1, and a locking mechanism is reset and is started to shut off the passage of fluid which is not shown.

The steel ball 3 is sustained at the center of the conical recess 5 of the separator member 4 by way of the magnetic force of the magnet 2. At this moment, if now vibration of a low frequency range is exerted on the steel ball 3, the steel ball 3 rolls gradually toward the periphery of the separator member 4 having increasing thickness from the center thereof. And as the thickness of the separator member 4 increases the magnetic force attracting the steel ball 3 is weakened, whereby the steel ball 3 is allowed to fall down due to the graviational force. Next, as the vibration of middle frequency range is exerted on the steel ball 3, the steel ball 3 becomes slidably displaced beyond its rotational displacement with respect to the lower surface of the separator member 4; being combined with the tilted surface of said conical recess, the steel ball overcomes the magnetic force acting to it and falls down. Furthermore, as the steel ball 3 is subjected to the vibration of high frequency range, the steel ball 3 is automatically rotated with the perpendicular passing through the center thereof as an axis owing to the displacement of the steel ball 3 toward the inclined surface of the conical recess and constant vibration of high frequencies. And as the steel ball is rotated, there develops a tortional slide movement at an upper contacting part of the steel ball; the torsional slide movement overcomes the magnetic force acting to the steel ball 3, so that it is allowed to fall down.

The steel ball 3 does not undergo movement for the vibration frequencies of less than a certain value.

Below is illustrated a mechanism to hold the device of the present invention in a horizontal plane.

The lower surface of the magnet 2 have to be maintained always in a horizontal plane, since the steel ball 3 is hung by magnetic force below the surface of the magnet 2 in the vibration-sensing part. To attain this purpose, the shafts 12 in the 180° directions from the retainer fitting 11 of the magnet 2, and the tips of each of the shafts 12 are sharpened and supported by means of pivot bearings 13, 13. The shafts 15 are also protruded in the 180° directions from the inner frame 14 which is formed integrally with said bearings 13, 13, and the tips of each of said shafts 15 are sharpened and supported by means of pivot bearings 16, 16. The bearings 16, 16 are secured on the right and left sides of a recessed frame formed on a plate 17. Here, the bearings 13, 13 and 16, 16 are positioned being displaced by 90° to each of the other pairs. Hanging members 18, on the other hand, protrude downward from the magnet retainer fitting 11, and further, an oscillator plate 19 is provided in the lateral direction from the tips of said hanging members 18. Therefore, the lower surface of the magnet 2 is maintained always in a horizontal plane and is liberated from the inclination of the plate 17, owing to the function of said bearing mechanism and the function of the oscillator plate 19.

Beneath the steel ball 3 is provided a receiving dish 6 which is supported on the bed 20 by way of a cylinder and a support rod inserted in said cylinder to be movable in the up and down directions. Here, the bed 20 is always energized downwardly by way of a compression spring 21 between the pull-up lever 22 and the plate 17, and can also be manually raised upwardly by way of the pull-up lever 22. Though not shown, a projection is provided on the lower central surface of the bed 20 to press the upper surface of the oscillator plate 19 by way of said projection. The support lever 7 of the receiving dish 6 serves as a starter lever. The pawl 10 at the tip of the lever 9 is displaced upward against the force of the pulling spring 23 as the support lever 7 is displaced downward after the steel ball has fallen on said receiving dish 6. Then, the operation mechanism 24 is liberated from the locking means to commence the sensing.

Where the device of the present invention is to be transported or installed, the pull-up lever 22 is pulled down by the force of the spring 21, and the oscillator plate 19 is pressed and fixed to the lower surface of the bed 20 so that the magnet-mounting mechanism at the upper part is held stationary, to perform the work. Then, after the device of the present invention is mounted and fixed on the object which may undergo vibration, the pull-up lever 22 is pulled up by manually to separate the bed 20 away from the upper surface of the oscillator plate 19. The oscillator plate 19 is then made free to oscillate. If the plate 17 is not in a horizontal plane, the magnet retainer fitting 11 works to correct the deviation caused by inclination owing to the function of the four bearings 13, 13 and 16, 16, in order that the lower surface of the magnet 2 is restored to the horizontal plate. The phenomenon of restoration is transmitted to the oscillator plate 19 via the hanging members 18; the deviation due to the inclination also appears on said oscillator plate which then remains stationary at some position deviated from the center. When the oscillator plate 19 remains stationary, the finger is separated away from the pull-up lever 22 and permitted to be displaced downwardly due to the force of the spring 21. The bed 20 is then lowered and its lower surface hits the oscillator plate 19; the oscillator plate 19 is then fixed. As the oscillator plate 19 is fixed, the upper shaft mechanism is also fixed. The lower surface of the magnet 2 is then held in a horizontal relation at the mounting position. If now the lever 22 is pulled up to raise the bed 20, the receiving dish 6 on the bed is also raised; the steel ball 3 in said receiving dish reaches the lower surface of the magnet 2. Then, if the lever 22 is lowered down by the function of the spring 21, the bed 20 formed integrally with said lever 22 and the receiving dish 6 are lowered too. But here, the steel ball 3 is held by the magnetic force of the magnet 2 and is not lowered. That is, the steel ball 3 is set to the lower surface of the magnet by means of the lever 22 which is pulled up.

According to the present invention being constructed and having functions as mentioned above, the contacting surface at which will be positioned the steel ball 3 that will be attracted by the magnetic force is made in the shape of a conical recess 5. Hence the steel ball is permitted to fall down uniformly and reliably responsive to the vibrations higher than a certain value that may cause damage to human beings and animals, over the lower, middle and higher frequency ranges. For example, when vibrations of 1 to 5 HZ of a horizontal vibrating acceleration of 80 gal is applied, it was confirmed the steel ball has fallen within a range of ±20 gal. Even where the sizes of magnet and steel ball were changed variously, the steel ball fell down stably within a deviation range of ±20%, giving a proof that the device would exhibit effects for use in fire-preventing starter devices to cope with earth quakes, etc.

Besides, according to the present invention, the magnet retainer fitting 11 is supported by four bearings 13, 13 and 16, 16 and the oscillator plate 19 hung integrally from said magnet retainer fitting 11 is fixed at a deviated position, so that the vibration-sensing part is always maintained just along a vertical line, making it possible to produce reliable vibration-sensing and starting effects even where the object body is being inclined.

What is claimed is:

1. A quake-sensing starting device comprising;
a magnet supported by a retainer fitting;
a separator member made of a non-magnetic material fixed to the lower surface of said magnet;
a conical recess of an opening degree of 140° to 170° formed on the lower surface of said separator member;
a steel ball adsorbed to the center of said recess;
a receiving dish provided underneath said steel ball maintaining a distance; and
means which convert the downward displacement of the receiving dish caused by the falling steel ball thereto into a starting force.

2. A quake-sensing starting device as set forth in claim 1 wherein the separator member is protruded from the lower edge of the magnet in order that the lower surface of said magnet and the lower surface of the separator member will form a conical recess.

3. A quake-sensing starting device as set forth in claim 1 wherein at least the upper surface of the weight adsorbed by the magnet is made in the form of a hemispherical ball.

4. A quake-sensing starting device as set forth in claim 1, wherein said receiving dish is supported at an end of a lever which is pivotally supported at its middle part to form a receiving-dish support mechanism, a pawl locking operation of said lever is provided at the other end of said lever, and means is provided to move said receiving dish upward and to lock said operation of said lever by way of said pawl.

5. A quake-sensing starting device comprising;
a magnet retainer fitting supported always in a horizontal plane by way of a pair of bearings which are deviated by 90° with respect to an inner frame which is supported by another pair of bearings to the right and left support frames;
a magnet supported by way of said retainer fitting;
a steel ball adsorbed onto the lower surface of said magnet;
a receiving dish provided underneath said steel ball maintaining a distance therefrom;
means which convert the downward displacement of the receiving dish caused by the falling steel ball thereto into a starting force;
a base by which said receiving dish is supported to be movable in the up and down directions;
means which can be externally operated to pull up said base against the force of a spring; and
an oscillator plate which is extended underneath said base by way of hanging members that are protruded downward from said magnet retainer fitting, said oscillator plate being provided at a position at which it is fixed by contact with said base when said base is pushed downward.

6. A quake-sensing starting device comprising;
a magnet retainer fitting supported always in a horizontal plane by way of a pair of bearings which are deviated by 90° with respect to an inner frame which is supported by another pair of bearings to the right and left support frames;
a separator member made of a non-magnetic material fixed to the lower surface of said magnet;
a conical recess of an opening degree of 140° to 170° formed on the lower surface of said separator member;
a steel ball adsorbed to the center of said recess;
a receiving dish provided underneath said steel ball maintaining a distance therefrom;
means which convert the downward displacement of the receiving dish caused by the falling steel ball thereto into a starting force;
a base by which said receiving dish is supported to be movable in the up and down directions;
means which can be externally operated to pull up said base against the force of a spring; and
an oscillator plate which is extended underneath said base by way of hanging members that are protruded downward from said magnet retainer fitting, said oscillator plate being provided at a position at which it is fixed by contact with said base when said base is pushed downward.

* * * * *